P1010718406B2

United States Patent
Farrell

(10) Patent No.: US 10,718,406 B2
(45) Date of Patent: Jul. 21, 2020

(54) RATCHETING STRAP ADJUSTER

(71) Applicant: Pure Safety Group, Inc., Pasadena, TX (US)

(72) Inventor: William Leo Farrell, Kent, WA (US)

(73) Assignee: Pure Safety Group, Inc., Pasadena, TX (US)

( * ) Notice: Subject to any disclaimer, the term of this patent is extended or adjusted under 35 U.S.C. 154(b) by 0 days.

(21) Appl. No.: 16/192,243

(22) Filed: Nov. 15, 2018

(65) Prior Publication Data

US 2019/0154116 A1 May 23, 2019

Related U.S. Application Data

(60) Provisional application No. 62/662,806, filed on Apr. 26, 2018, provisional application No. 62/587,719, filed on Nov. 17, 2017.

(51) Int. Cl.
*F16G 11/12* (2006.01)
*A62B 35/00* (2006.01)
*A44B 11/12* (2006.01)

(52) U.S. Cl.
CPC ............ *F16G 11/12* (2013.01); *A44B 11/125* (2013.01); *A62B 35/0025* (2013.01); *A62B 35/0031* (2013.01)

(58) Field of Classification Search
CPC ........ A44B 11/125; F16G 11/12; B60P 7/083; B60P 7/0846; Y10T 24/21; Y10T 24/2175
See application file for complete search history.

(56) References Cited

U.S. PATENT DOCUMENTS

| | | |
|---|---|---|
| 6,230,370 B1 | 5/2001 | Nelsen |
| 6,241,174 B1 | 6/2001 | Nelsen et al. |
| 6,799,751 B1 * | 10/2004 | Anderson ............... B60P 7/083 24/68 CD |
| 8,794,378 B2 | 8/2014 | Wolner |
| 8,967,332 B2 | 3/2015 | Wolner |
| 2002/0153517 A1 | 10/2002 | Huang |

FOREIGN PATENT DOCUMENTS

WO  2010117651 A1  10/2010

OTHER PUBLICATIONS

International Search Report from PCT/US2018/061451; 6 pages; Michael Becker; dated Feb. 12, 2019.

* cited by examiner

*Primary Examiner* — Robert Sandy
*Assistant Examiner* — Michael S Lee
(74) *Attorney, Agent, or Firm* — Dicke, Billig & Czaja, PLLC

(57) ABSTRACT

A ratcheting strap adjuster comprising a bracket, a webbing plate, and one or more captive members. The webbing plate is rotatably coupled to the bracket. Each of the one or more captive members is moveable between an engaged position and a disengaged position, wherein the one or more captive members restrict rotation of the webbing plate in one direction when the one or more captive members are in the engaged position and allow rotation of the webbing plate in the one direction and in an opposite second direction when the one or more captive members are in the disengaged position.

19 Claims, 20 Drawing Sheets

RATCHETING STRAP ADJUSTER

CROSS-REFERENCE TO RELATED APPLICATIONS

This application claims the benefit of U.S. Provisional Application Ser. No. 62/587,719, filed Nov. 17, 2017, and U.S. Provisional Application Ser. No. 62/662,806, filed Apr. 26, 2018, which are incorporated in their entirety herein by reference.

BACKGROUND

Safety regulations, for example Occupational Safety and Health Administration (OSHA) regulations, require that workers working from heights wear fall protection equipment, including a safety harness that is connected by lifeline or lanyard to an anchor point. The snug and properly-adjusted fit of a safety harness is important to the user's safety. A safety harness that is too loose may allow the user to slip free from the harness during a fall. A harness that is improperly adjusted may transfer the load from the lifeline to an unsafe point on the user and lead to suspension trauma or other injury while the user awaits rescue. The ease of safety harness adjustment is a leading factor in the user's willingness to take the time to correctly adjust their harness for safe operation. A difficult or unintuitive harness webbing adjuster may discourage the user from properly adjusting the harness to fit during each donning. Furthermore, some harness adjustment mechanisms allow excess webbing to dangle freely from the end of the adjuster, which may create additional snag or entanglement hazards.

BRIEF SUMMARY

The above-mentioned problems associated with prior devices are addressed by embodiments of the disclosure and will be understood by reading and understanding the present specification. The following summary is made by way of example and not by way of limitation.

In one example, a ratcheting strap adjuster comprises a bracket, a webbing plate, and one or more captive members. The webbing plate is rotatably coupled to the bracket. Each of the one or more captive members is moveable between an engaged position and a disengaged position, wherein the one or more captive members restrict rotation of the webbing plate in one direction when the one or more captive members are in the engaged position and allow rotation of the webbing plate in the one direction and in an opposite second direction when the one or more captive members are in the disengaged position.

In one example, a ratcheting strap adjuster, comprises a bracket, a webbing plate rotatably coupled to the bracket, and first and second captive members. The first and second captive members are moveable between an engaged position and a disengaged position. Each of the first and second captive members includes an angled portion configured and arranged to restrict rotation of the webbing plate in one direction when the first and second captive members are in the engaged position and allow rotation of the webbing plate in the one direction and in an opposite second direction when the first and second captive members are in the disengaged position.

BRIEF DESCRIPTION OF THE DRAWINGS

The present disclosure can be more easily understood, and further advantages and uses thereof can be more readily apparent, when considered in view of the detailed description and the following Figures in which.

In accordance with common practice, the various described features are not drawn to scale but are drawn to emphasize specific features relevant to the present disclosure. Reference characters denote like elements throughout the Figures and the text.

DETAILED DESCRIPTION

Figure 1:
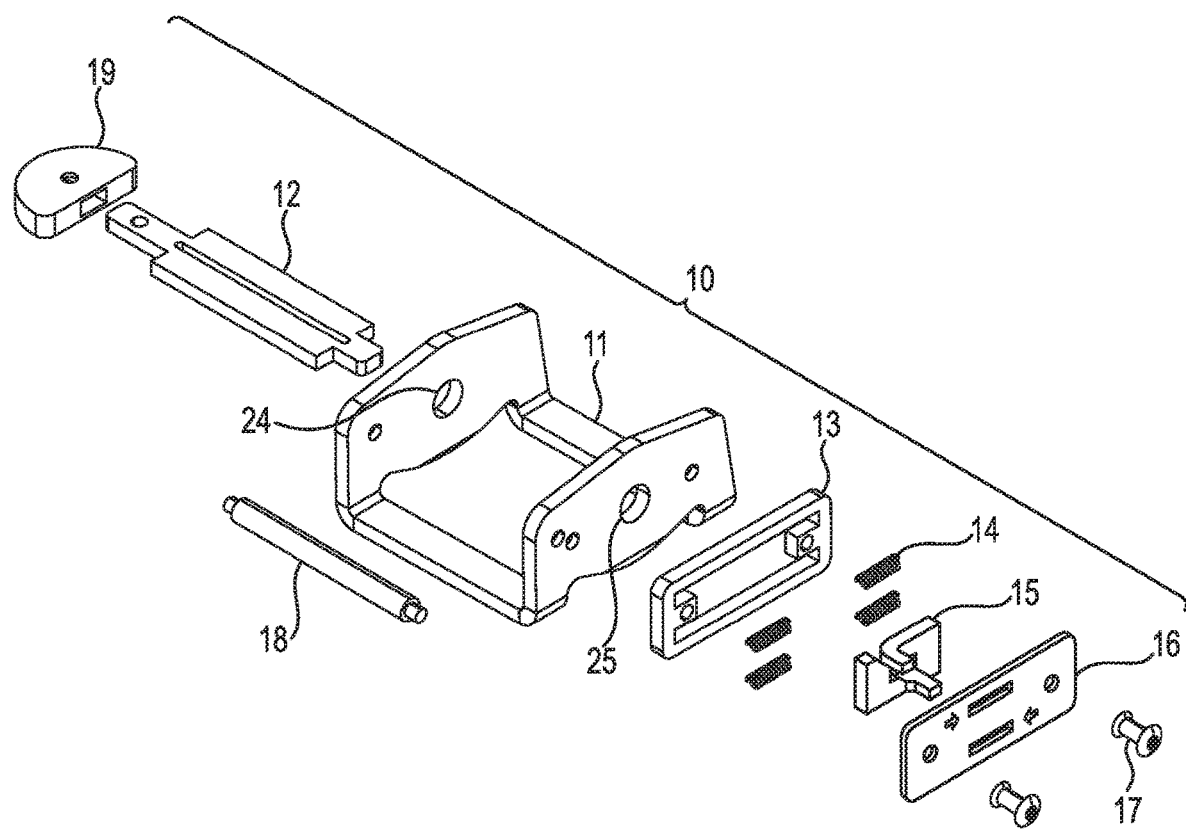
FIG. 1 is an exploded view of an example ratcheting strap adjuster.
Figure 2:
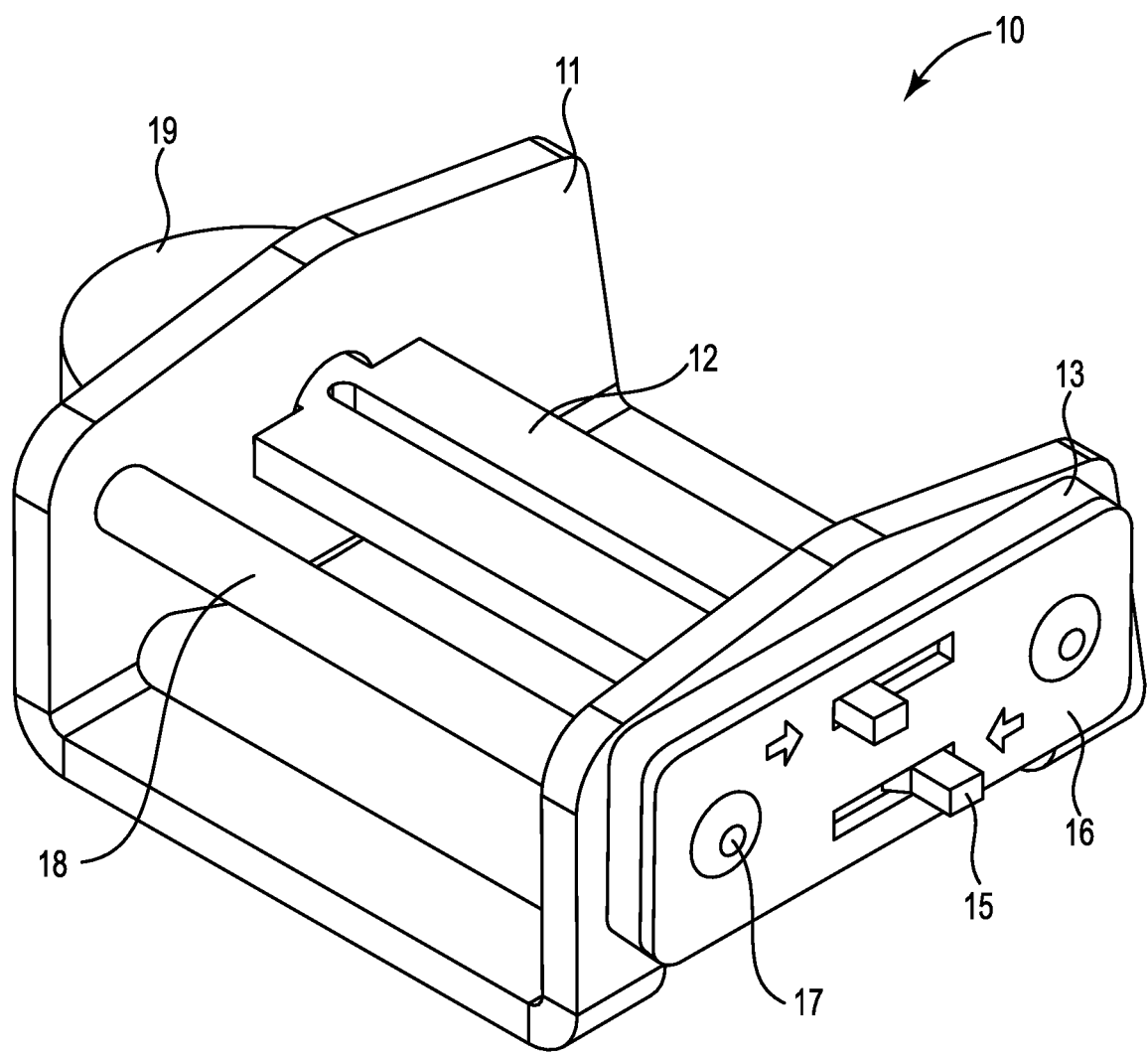
FIG. 2 is a perspective view of the ratcheting strap adjuster shown in FIG. 1.

In the following detailed description, reference is made to the accompanying drawings, which form a part hereof, and in which is shown by way of illustration embodiments in which the disclosure may be practiced. It is to be understood that other embodiments may be utilized and mechanical changes may be made without departing from the spirit and scope of the present disclosure. The following detailed description is, therefore, not to be taken in a limiting sense.

Examples of ratcheting strap adjusters described herein enable a user to selectively adjust a webbing or strap using a single hand for ease of use. In at least some examples, the strap may be loosened using a single-handed double action to facilitate decreasing a likelihood of inadvertent loosening. The ratcheting strap adjusters described herein maintain at least some webbing in a contained manner such that an amount of webbing dangling freely from the ratcheting strap adjuster is limited.

Referring to FIGS. 1-4, an example ratcheting safety harness adjuster or strap adjuster 10 includes a bracket 11 and a webbing plate 12 coupled to the bracket 11. In some examples, the bracket 11 is generally U shaped. For example, the bracket 11 may have a first sidewall, a second sidewall spaced from the first sidewall, and one or more lateral walls extending between the first sidewall and the second sidewall.

The webbing plate 12 extends between the first sidewall and the second sidewall. In some examples, the webbing plate 12 includes a first end portion that extends through a first opening 24 defined in the first sidewall and a second end portion that extends through a second opening 25 defined in the second sidewall. In this manner, the webbing plate 12 may be coupled to the bracket 11 in a manner that restricts the webbing plate 12 from translating relative to the bracket 11 while allowing the webbing plate 12 to rotate about a longitudinal axis of the webbing plate 12 (e.g., the pivot point). For example, the first end portion and second end portion may rotate about the pivot point within the first opening 24 and second opening 25, respectively. In some examples, a thumb knob 19 is coupled to the webbing plate 12 (e.g., at the first end portion) for use in rotating the webbing plate 12 with increased leverage. The thumb knob 19 may have, for example, one or more portions spaced farther from the pivot point and/or extending substantially perpendicular to the longitudinal axis of the webbing plate 12. In some examples, the thumb knob 19 has an opening defined therein sized and/or configured to receive the first end portion. A rivet (not shown), for example, may be extended through another opening defined in the thumb knob 19 and/or an opening defined in the first end portion to securely couple the thumb knob 19 to the webbing plate 12.

In some examples, a webbing guide 18 extends between the first sidewall and the second sidewall. The webbing guide 18 is spaced from a first lateral wall to define a first channel therebetween and from the webbing plate 12 to define a second channel therebetween in fluid communication with the first channel. The webbing guide 18 may have, for example, a generally cylindrical body.

A captive arm locking mechanism including a spacer plate 13 and/or a cover plate 16 is coupled to the bracket 11. One or more rivets 17, for example, may be extended through one or more openings defined in the spacer plate 13, cover plate 16, and/or bracket 11 to securely couple the captive arm locking mechanism to the bracket 11.

The captive arm locking mechanism includes a plurality of captive arms or members 15 that are moveable between an engaged position and a disengaged position. The captive arms 15 may be housed and/or positioned in a cavity defined by the bracket 11, spacer plate 13, and/or cover plate 16. Each captive arm 15 includes a notch 27 sized and/or configured to receive an outer portion of the webbing plate 12. The outer portion of the webbing plate 12 may be a corner of the webbing plate 12, for example. The outer portion of the webbing plate 12 is positionable in the notch 27 of one of the captive arms 15 when the captive arms 15 are in the engaged position.

The webbing plate 12 is generally rotatable about the longitudinal axis of the webbing plate 12 (e.g., the pivot point) between a seated position, in which the outer portion of the webbing plate 12 is positioned in the notch 27 of one of the captive arms 15, and an unseated position, in which the outer portion of the webbing plate 12 is spaced or removed at least partially from each notch 27 of the captive arms 15. A plurality of surfaces of the outer portion of the webbing plate 12 may interface and/or engage with (e.g., touch) a plurality of surfaces defining the notch 27, for example, when the webbing plate 12 is in the seated position. In some examples, the webbing plate 12 is rotatable from the seated position in a first direction (e.g., a clockwise direction from the perspective shown at FIG. 3), and/or is restricted from rotating from the seated position in an opposite second direction (e.g., a counter-clockwise direction from the perspective shown at FIG. 3). In this manner, the strap adjuster 10 may be "ratcheted" in that the webbing plate 12 rotates from the seated position in only one direction. In some examples, the webbing plate 12 is biased toward the seated position.

The webbing plate 12 may be rotated away from the seated position to move the captive arms 15 toward the disengaged position. Each captive arm 15 includes an arcuate surface at a radius that is equal or substantially similar to a distance between an outer surface of the outer portion of the webbing plate 12 and the pivot point. In this manner, the outer surface of the outer portion of the webbing plate 12 may be moved generally along the arcuate surface of the captive arm 15 as the webbing plate 12 is rotated (e.g., in either direction) about the pivot point. In some examples, the captive arms 15 move toward the disengaged position at a first rate as the outer surface of the outer portion of the webbing plate 12 is moved away from the notch 27 of one captive arm 15 and along the arcuate surface of an adjacent captive arm 15. The captive arms 15 may remain in the engaged position as the outer surface of the outer portion of the webbing plate 12 is moved between the notch 27 of one captive arm 15 and the arcuate surface of an adjacent captive arm 15.

Each captive arm 15 includes an intermediate surface extending between the arcuate surface and its own notch 27. The outer surface of the outer portion of the webbing plate 12 may be moved generally along the intermediate surface of the captive arm 15 as the webbing plate 12 is rotated (e.g., in either direction) about the pivot point. A distance between the intermediate surface of the captive arm 15 and the longitudinal axis of the webbing plate 12 generally decreases from one end portion of the intermediate surface proximate to the arcuate surface to an opposing end portion of the intermediate surface proximate to the notch 27. That is, a first distance between the one end portion of the intermediate surface and the pivot point is greater than a second distance between the opposing end portion of the intermediate surface and the pivot point. The captive arms 15 may move toward the disengaged position as the outer surface of the outer portion of the webbing plate 12 is moved along the intermediate surface in a first direction (e.g., toward the notch 27), and toward the engaged position as the outer surface of the outer portion of the webbing plate 12 is moved along the intermediate surface in an opposite second direction (e.g., towards the arcuate surface). In some examples, the captive arms 15 move toward the disengaged position at a second rate greater than the first rate as the outer surface of the outer portion of the webbing plate 12 is moved away from the arcuate surface and along the intermediate surface of one of the captive arms 15.

When the outer surface of the outer portion of the webbing plate 12 is moved in the first direction beyond the intermediate surface, the captive arms 15 move toward the engaged position. In some examples, the captive arms 15 move toward the engaged position at a third rate having an absolute value greater than the second rate and/or the first rate after the outer surface of the outer portion of the webbing plate 12 is moved in the first direction beyond the intermediate surface and into the notch 27 of one of the captive arms 15.

The captive arms 15 may be configured and/or arranged such that the captive arms 15 interface and/or engage with (e.g., touch) the webbing plate 12 in a cooperative and/or synchronized manner. For example, the webbing plate 12 may have a plurality of outer portions that are concurrently positionable in the notches 27 of the captive arms 15 and moveable along corresponding surfaces (e.g., arcuate surfaces, intermediate surfaces) of the captive arms 15.

A plurality of return springs 14 bias the captive arms 15 toward the engaged position. For example, return springs 14 may be compressed between the captive arms 15 and the spacer plate 13 to provide a force urging the captive arms 15 toward the engaged position. In some examples, the force between the captive arms 15 and the spacer plate 13 generally increases as the webbing plate 12 is rotated in the first (e.g., clockwise) direction from the seated position until the outer surface of the outer portion of the webbing plate 12 is moved beyond the intermediate surface, at which point the force is released (e.g., decreases).

The captive arm locking mechanism includes one or more user interfaces (e.g., tabs, levers) coupled to the captive arms 15. Each user interface may be selectively actuated to move one or more corresponding captive arms 15 toward the disengaged position. The user interfaces may be generally firmly or rigidly coupled to the captive arms 15 such that movement of the user interface results in corresponding movement of the captive arms 15. The user interfaces may include, for example, tabs protruding from the cover plate 16. In some examples, the tabs are configured to move the captive arms 15 toward the disengaged position when the tabs are actuated in opposite directions. For example, a first tab (e.g., the left tab shown at FIG. 3) may be actuated towards a first direction (e.g., towards the left from the perspective shown at FIG. 3) to move a first captive arm 15 (e.g., the left captive arm shown at FIG. 3) towards the disengaged position, and a second tab (e.g., the right tab shown at FIG. 3) may be actuated towards a second direction (e.g., towards the right from the perspective shown at FIG. 3) to move a second captive arm 15 (e.g., the right captive arm shown at FIG. 3) towards the disengaged position.

Figure 3:
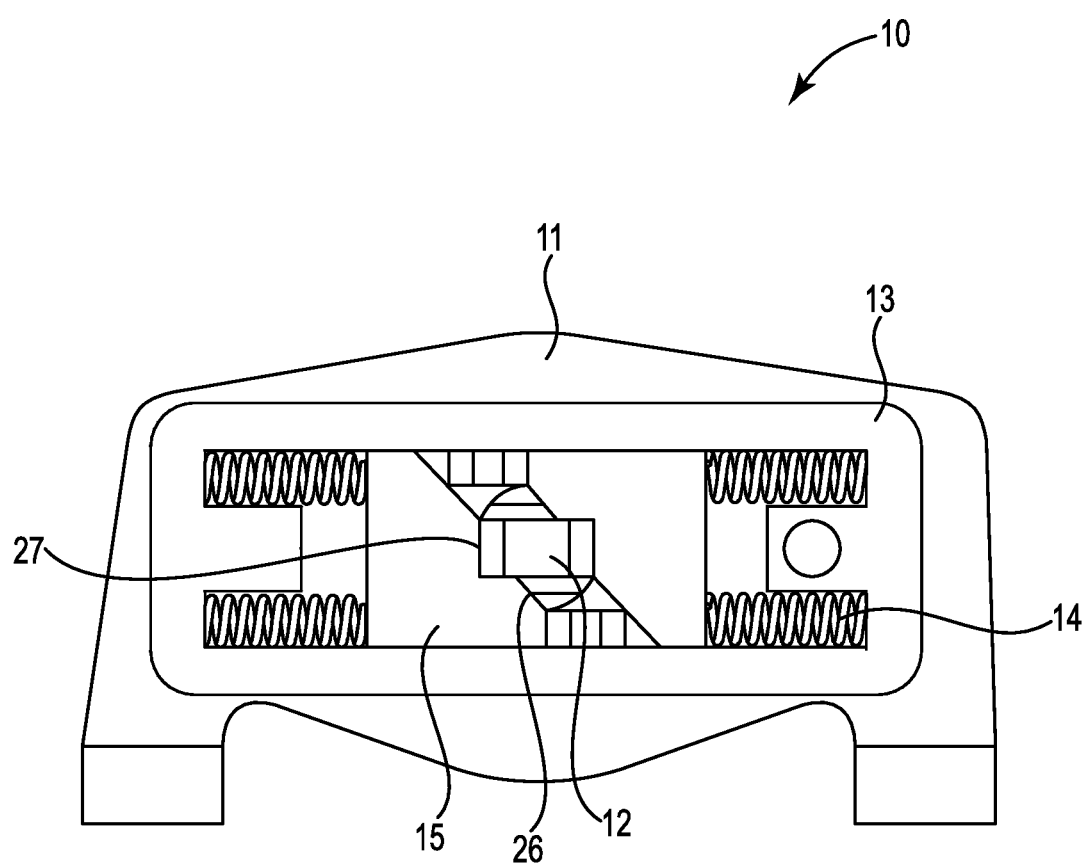
FIG. 3 is a plan view of an example captive arm locking mechanism that may be used with an adjuster, such as the ratcheting strap adjuster shown in FIG. 1.
Figure 4:
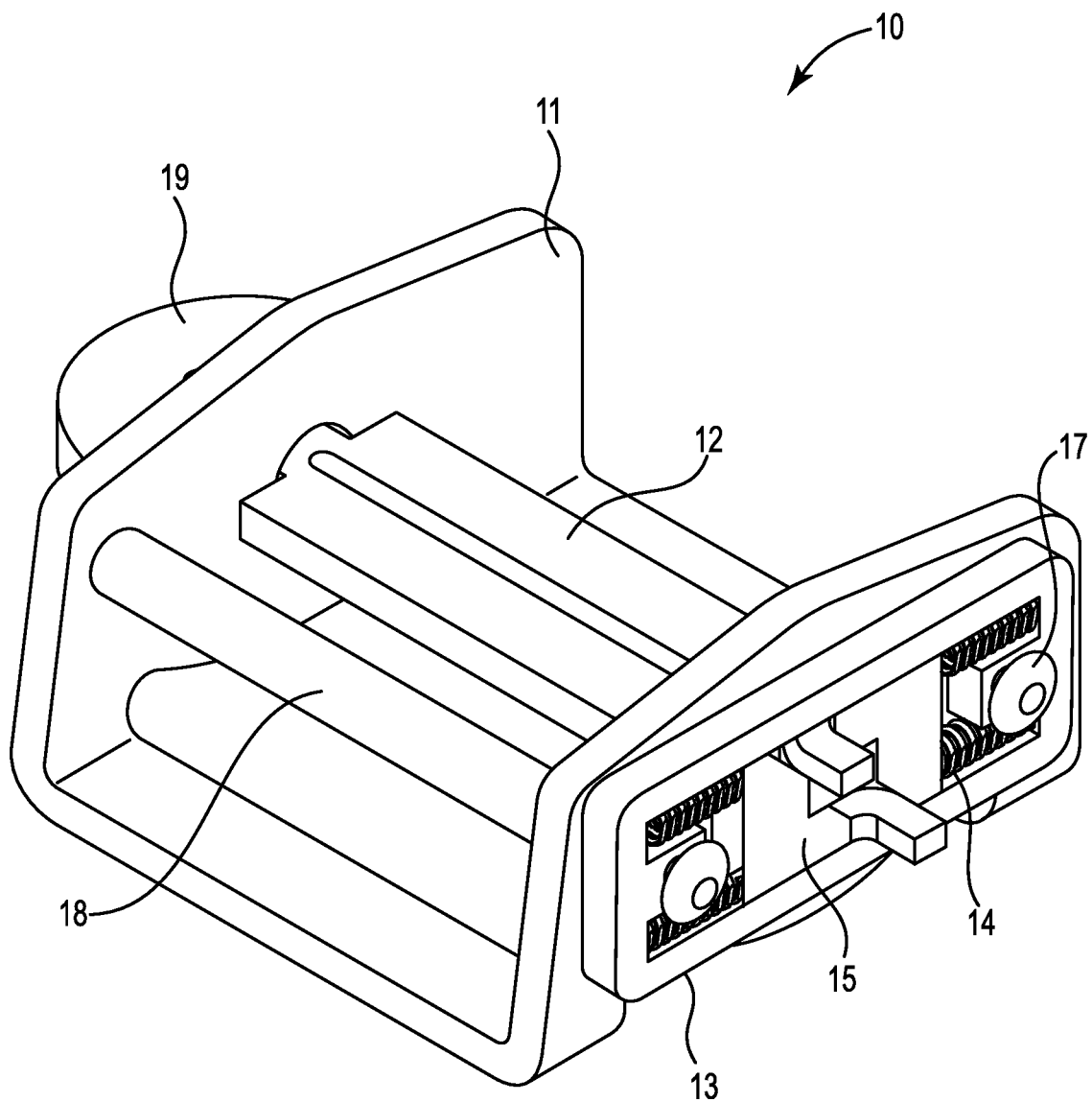
FIG. 4 is a perspective view of the ratcheting strap adjuster shown in FIG. 1 without a cover plate.

In some examples, a single captive arm 15 in the engaged position restricts the webbing plate 12 from rotating from the seated position in the counter-clockwise direction (e.g., as shown at FIG. 3). In this manner, the webbing plate 12 may be restricted from rotating from the seated position in one direction (e.g., the counter-clockwise direction from the perspective shown at FIG. 3) until each user interface is selectively actuated to move the captive arms 15 toward the disengaged position. When the captive arms 15 are in the disengaged position, the webbing plate 12 is rotatable in either the one direction (e.g., the counter-clockwise direction from the perspective shown at FIG. 3) or the opposite direction (e.g., the clockwise direction from the perspective shown at FIG. 3).

Figure 5:
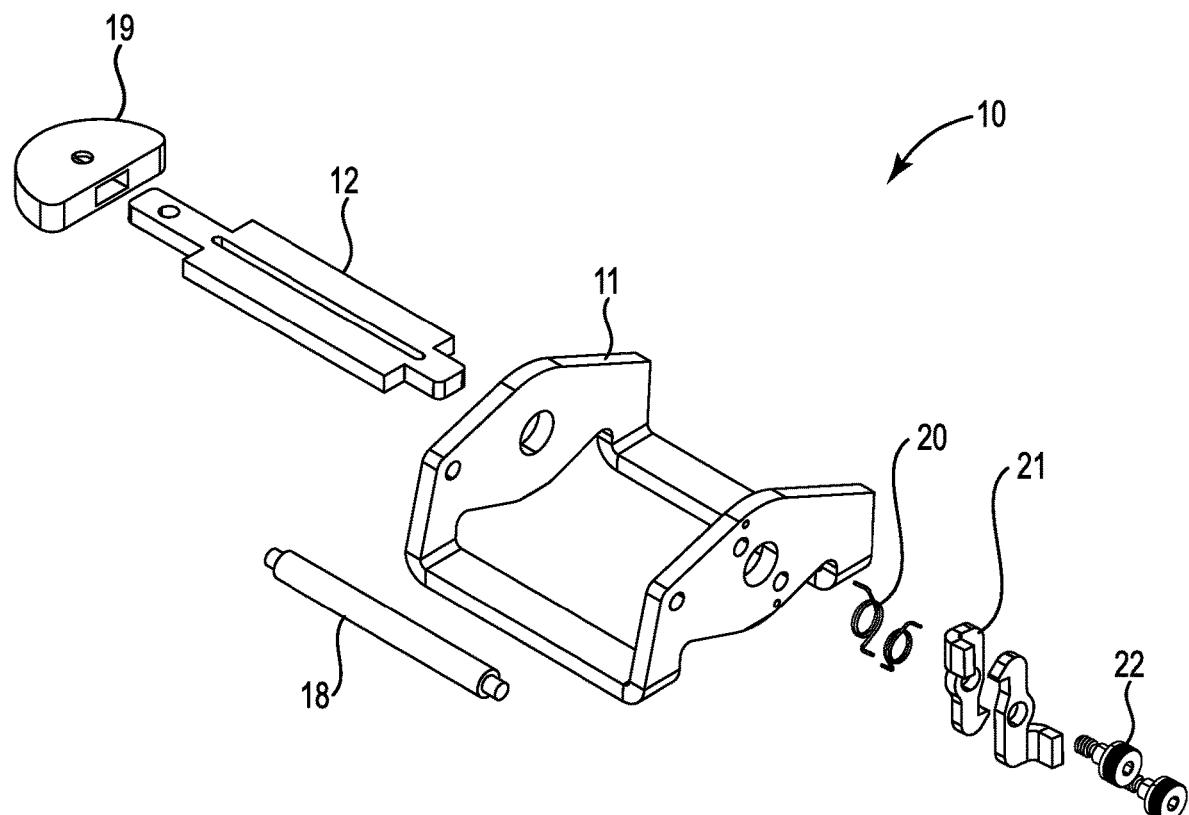
FIG. 5 is an exploded view of another example ratcheting strap adjuster.
Figure 6:
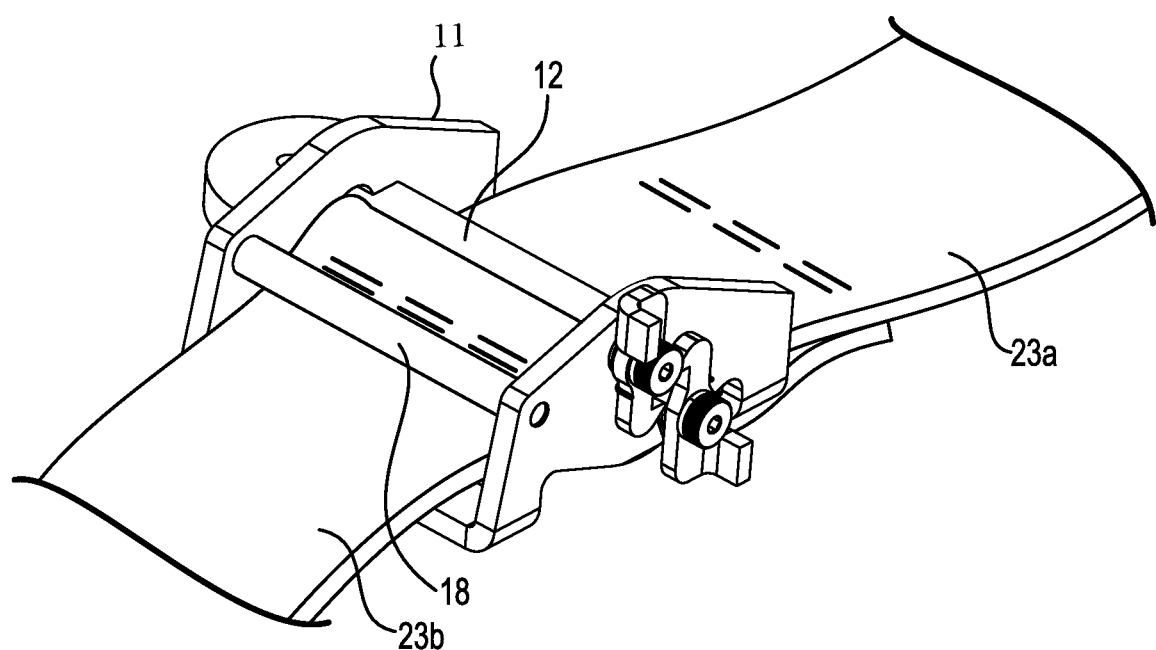
FIG. 6 is a partial view of an example safety harness system including the ratcheting strap adjuster shown in FIG. 5 and a webbing.

FIGS. 5 and 6 show another example of a strap adjuster. This alternate configuration utilizes a captive arm locking mechanism including torsion springs 20, captive arms 21, and shoulder bolts 22. In this configuration, the torsion springs 20 bias the rotating captive arms 21 against the webbing plate 12. The captive arms 21 include buttons proximate one end and angled portions proximate the other end. The angled portions are configured and arranged to restrict rotation of the webbing plate 12 in at least one direction. The rotating captive arms 21 pivot about the shoulder bolts 22 that are threaded into the bracket 11. The buttons are pivoted toward each other to move the captive arms 21 from engaged positions to disengaged positions.

Figure 7:
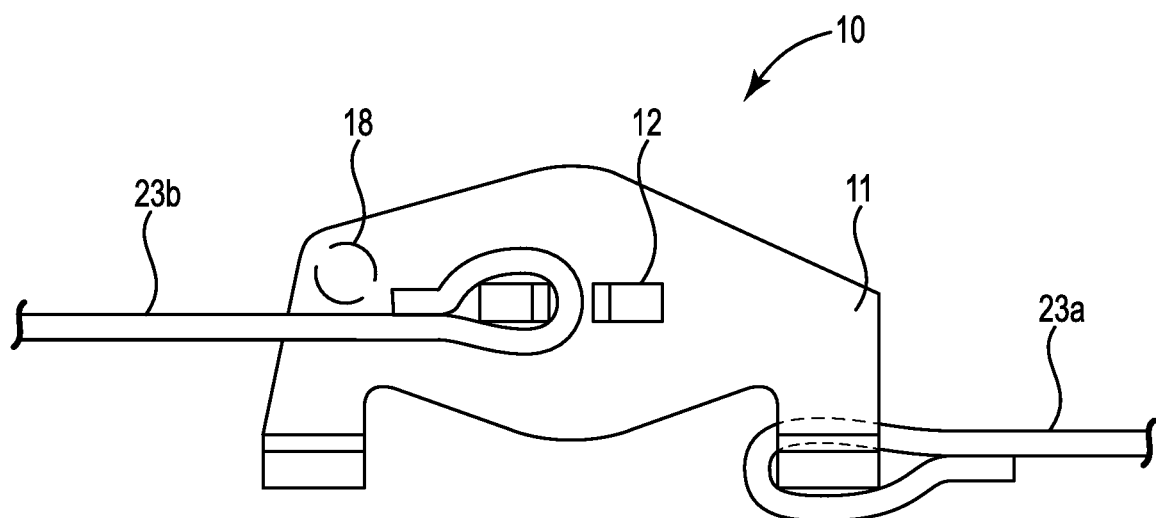
FIG. 7 is a sectional view of the safety harness system shown in FIG. 6.
Figure 8:
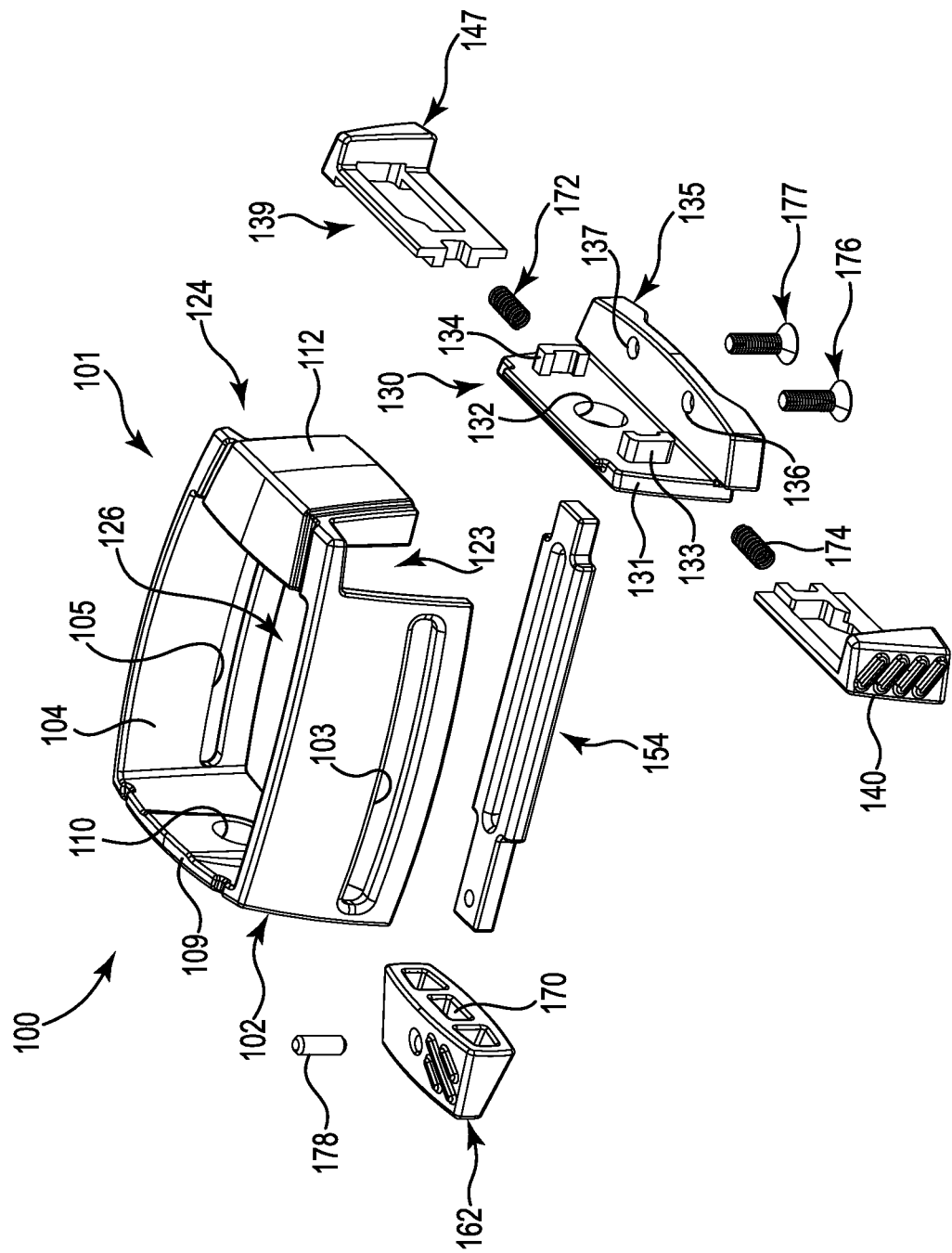
FIG. 8 is an exploded view of another example ratcheting strap adjuster.
Figure 9:
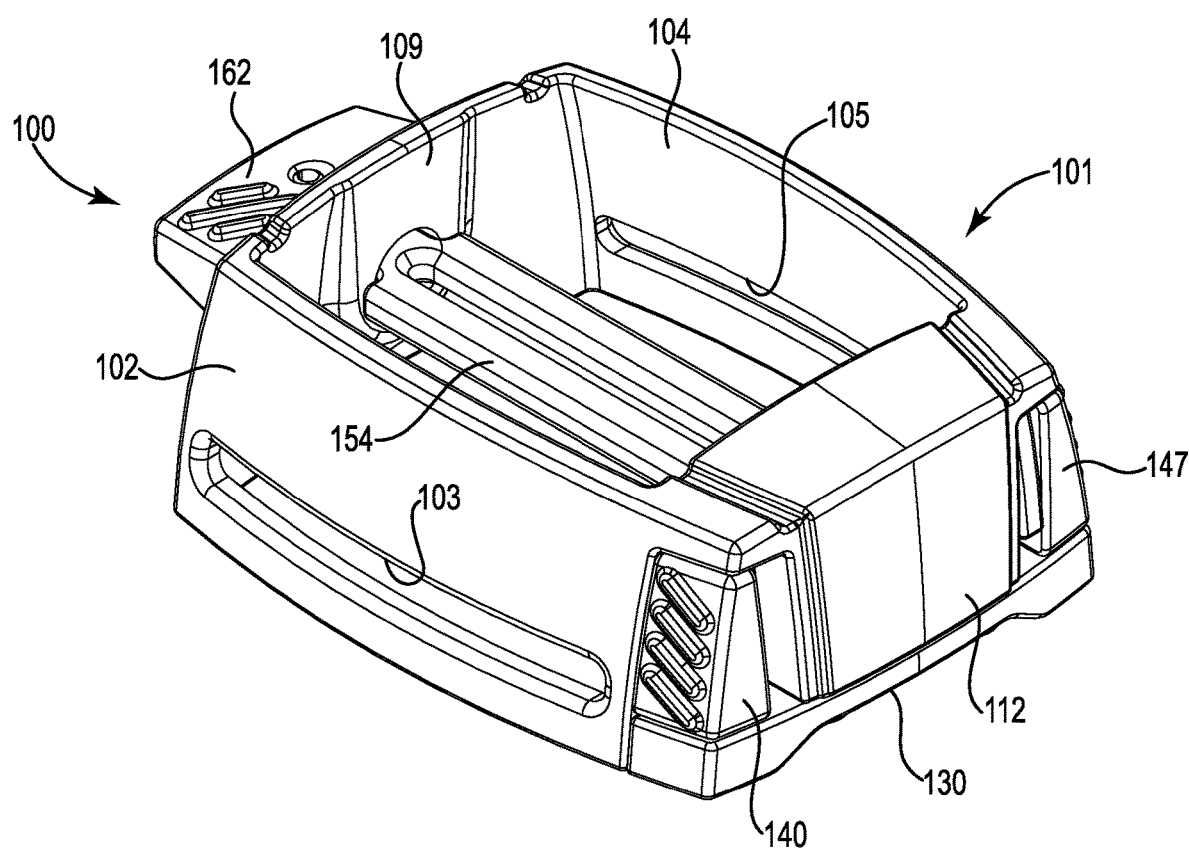
FIG. 9 is a perspective view of the ratcheting strap adjuster shown in FIG. 8.

FIGS. 6 and 7 show an example strap adjuster 10 with a fixed webbing 23a and an adjustable webbing 23b. The fixed webbing 23a may be coupled to one portion of the strap adjuster 10, and the adjustable webbing 23b may be coupled to another portion of the strap adjuster 10. As shown at FIGS. 6 and 7, the fixed webbing 23a generally circumscribes one leg of the bracket 11, and the adjustable webbing 23b generally circumscribes one leg of the webbing plate 12. An end segment of the fixed webbing 23a may be sewn onto a body segment of the fixed webbing 23a to securely couple the fixed webbing 23a to the bracket 11, and an end segment of the adjustable webbing 23b may be sewn onto a body segment of the adjustable webbing 23b to securely couple the adjustable webbing 23b to the webbing plate 12.

The webbing plate 12 may be rotated in the first (e.g., clockwise) direction to decrease an exposed (e.g., unwound) length of the adjustable webbing 23b and/or increase a tension in the adjustable webbing 23b. In this manner, a length of the adjustable webbing 23b that is wound or spooled around the webbing plate 12 may be increased as the webbing plate 12 is rotated in the first direction. The webbing plate 12 has a flat profile that allows the adjustable webbing 23*b* to be wound in a generally flat or oval configuration.

The captive arms 15 may have chamfered edges 26 that allow rotation of the webbing plate 12 (e.g., in the clockwise direction) while the captive arms 15 are under spring tension, which results in easy tightening of the adjustable webbing 23*b* without need to unlock the captive arms 15. To rotate the webbing plate 12 in the opposite (e.g., counterclockwise) direction, the user interfaces are actuated (e.g., in opposite directions) to move the captive arms 15 toward the disengaged position. This double-acting mechanism facilitates mitigating or reducing a risk of accidental loosening of the strap adjuster 10.

The webbing guide 18 guides or restricts a movement of the adjustable webbing 23*b*. The webbing guide 18 may, for example, guide the adjustable webbing 23*b* toward the webbing plate 12 as the webbing plate 12 is rotated and/or maintain a position of the adjustable webbing 23*b* relative to a user. Alternate configurations (not illustrated) of the adjustable webbing 23*b* in relation to the strap adjuster 10 include one continuous webbing passing through the webbing plate 12 without being sewn over any component of the strap adjuster 10.

In another example, referring to FIGS. 8-19, a strap adjuster 100 includes a housing or bracket 101, a captive member locking mechanism 139, a mandrel or webbing plate 154, and a knob 162.

Figure 10:
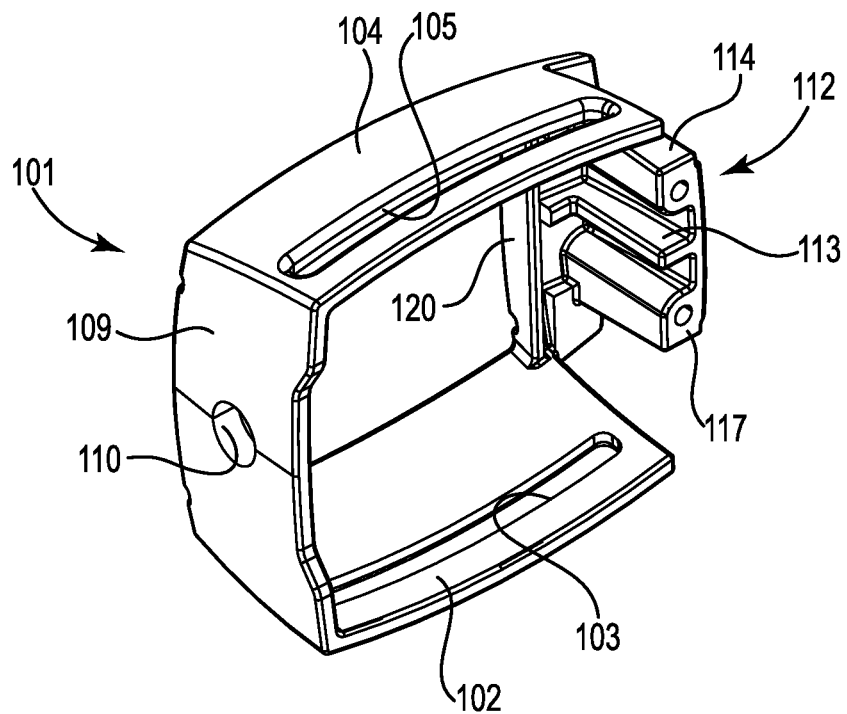
FIG. 10 is a perspective view of an example bracket that may be used with an adjuster, such as the ratcheting strap adjuster shown in FIG. 8.
Figure 11:
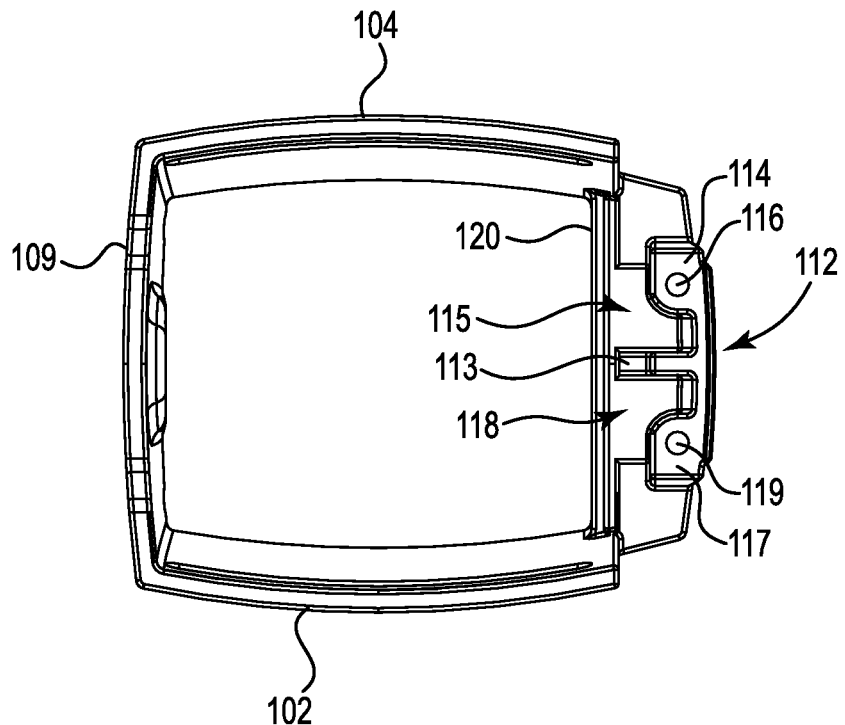
FIG. 11 is a bottom view of the bracket shown in FIG. 10.
Figure 12:
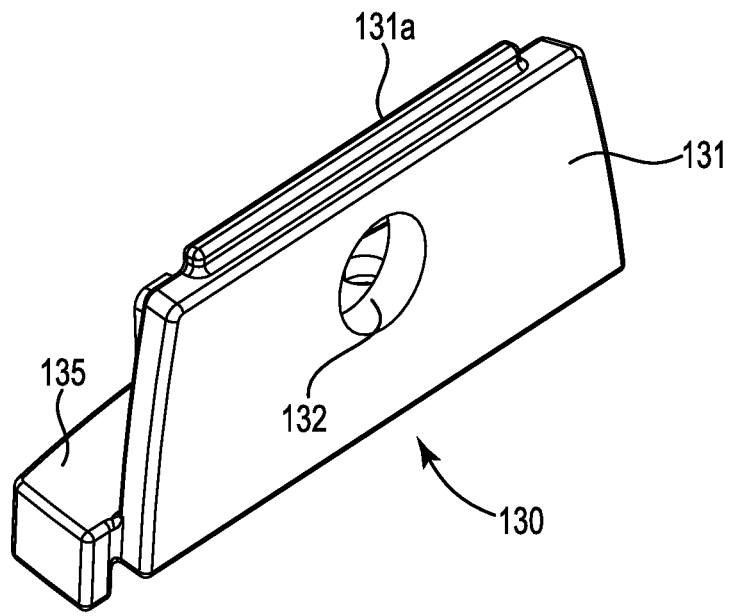
FIG. 12 is a perspective view of an example spacer plate that may be used with an adjuster, such as the ratcheting strap adjuster shown in FIG. 8.
Figure 13:
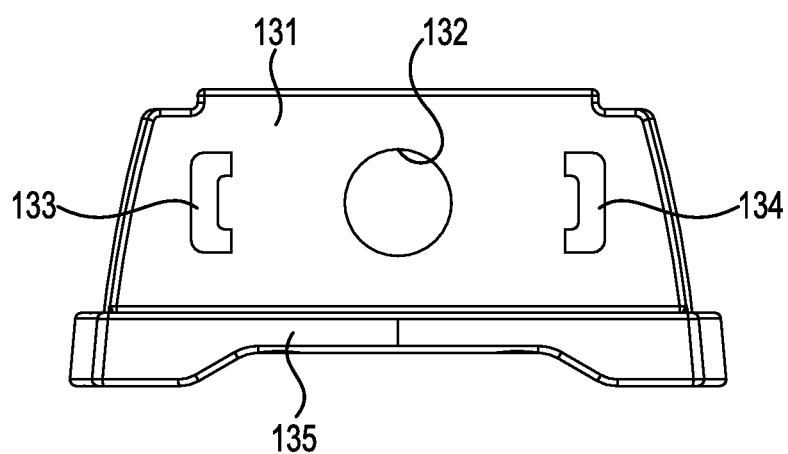
FIG. 13 is a front view of the spacer plate shown in FIG. 12.

As shown in FIGS. 10-11, the housing or bracket 101 includes a first side 102 with a slot 103 and a second side 104 with a slot 105 interconnected by a first end 109 and a second end 112. The first end 109 includes an aperture 110. The second end 112 includes a generally T-shaped portion having a divider portion 113 extending between a first receiver 114 and a second receiver 117. The first receiver 114 includes a first bore 116, and the second receiver 117 includes a second bore 119. The first receiver 114 and the divider portion 113 form a first cavity 115, and the second receiver 117 and the divider portion 113 form a second cavity 118. Extending between the first side 102 and the second side 104 proximate the second end 112 is an extension portion 120, which forms a gap with the divider portion 113. The first side 102 and the second end 112 form a first notch 123, and the second side 104 and the second end 112 form a second notch 124. A cavity 126 is formed by the first and second sides 102 and 104 and the first and second ends 109 and 112.

The captive member locking mechanism 139 includes a spacer plate 130 and captive members 140 and 147. The spacer plate 130 includes a first plate portion 131 extending upwardly from a second plate portion 135 in a generally L-shape. The first plate portion 131 includes an extension 131*a* extending upwardly therefrom and an aperture 132 proximate the middle. A first receiver 133 is positioned proximate one side of the aperture 132 and a second receiver 134 is positioned proximate an opposing side of the aperture 132. The second plate portion 135 includes first and second apertures 136 and 137.

Figure 14:
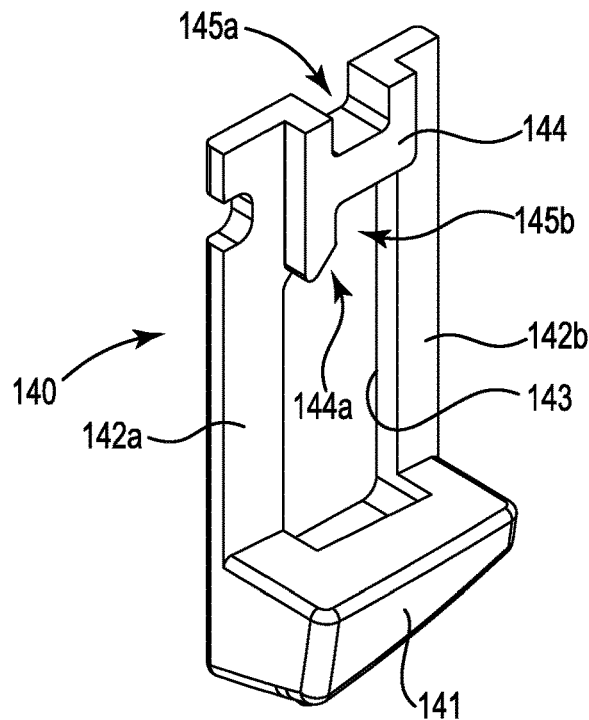
FIG. 14 is a perspective view of an example captive member that may be used with an adjuster, such as the ratcheting strap adjuster shown in FIG. 8.
Figure 15:
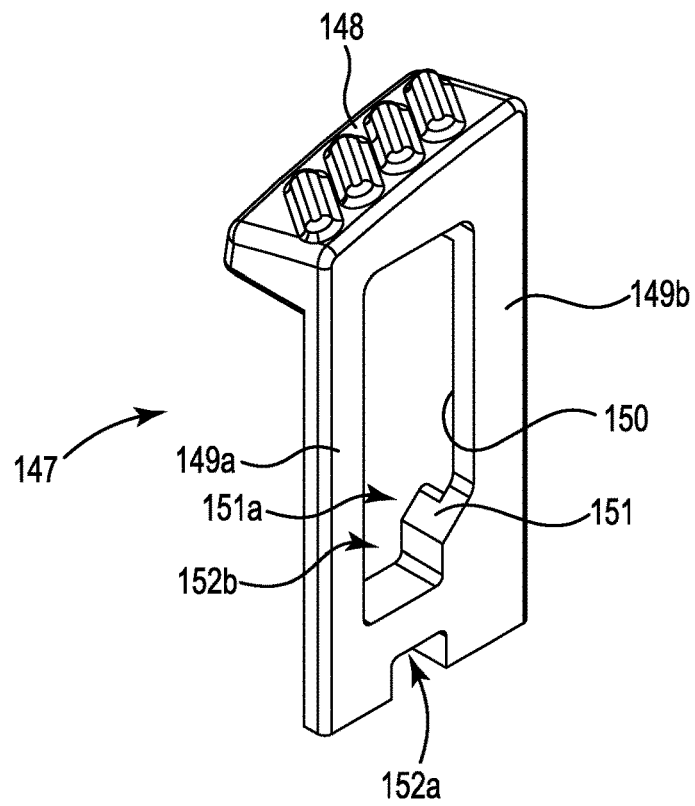
FIG. 15 is a perspective view of another example captive member that may be used with an adjuster, such as the ratcheting strap adjuster shown in FIG. 8.

The first captive member 140 includes a first button 141 from which extensions 142*a* and 142*b* extend in parallel and are interconnected by a first receiver portion 144 to form a cavity 143 therebetween. The first receiver portion 144 forms a receiving cavity 145*a* proximate its distal end and a receiving cavity 145*b* in communication with the cavity 143. The first receiver portion 144 includes an angled portion 144*a* that forms part of the receiving cavity 145*b*. The second captive member 147 includes a second button 148 from which extensions 149*a* and 149*b* extend in parallel and are interconnected by a second receiver portion 151 to form a cavity 150 therebetween. The second receiver portion 151 forms a receiving cavity 152*a* proximate its distal end and a receiving cavity 152*b* in communication with the cavity 150. The second receiver portion 151 includes an angled portion 151*a* that forms part of the receiving cavity 152*b*. The first captive member 140 is shown in FIG. 14, and the second captive member 147 is shown in FIG. 15.

Figure 16:
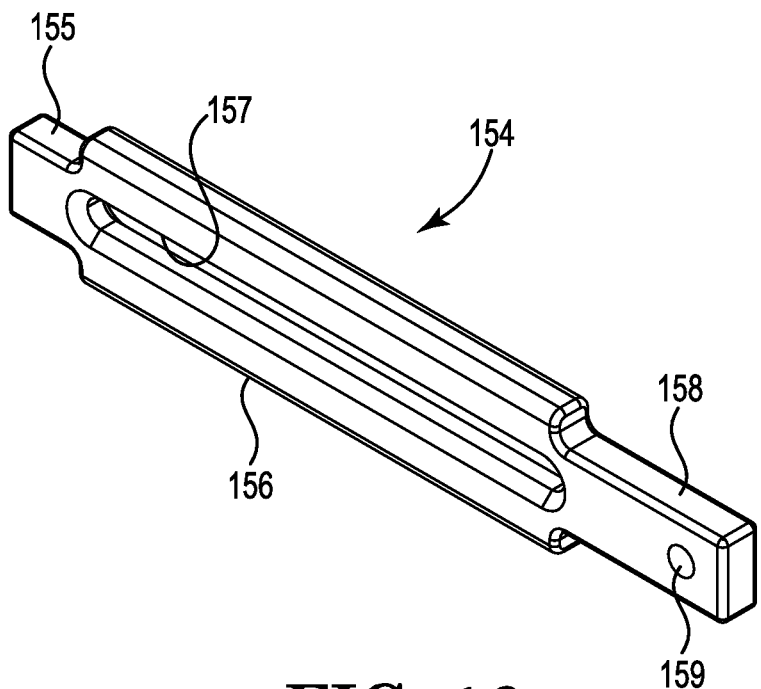
FIG. 16 is a perspective view of an example webbing plate that may be used with an adjuster, such as the ratcheting strap adjuster shown in FIG. 8.

As shown in FIG. 16, the mandrel or webbing plate 154 is a generally flat, rod-like member with a first end 155, an intermediate portion 156 with a slot 157, and a second end 158 with an aperture 159.

Figure 17:
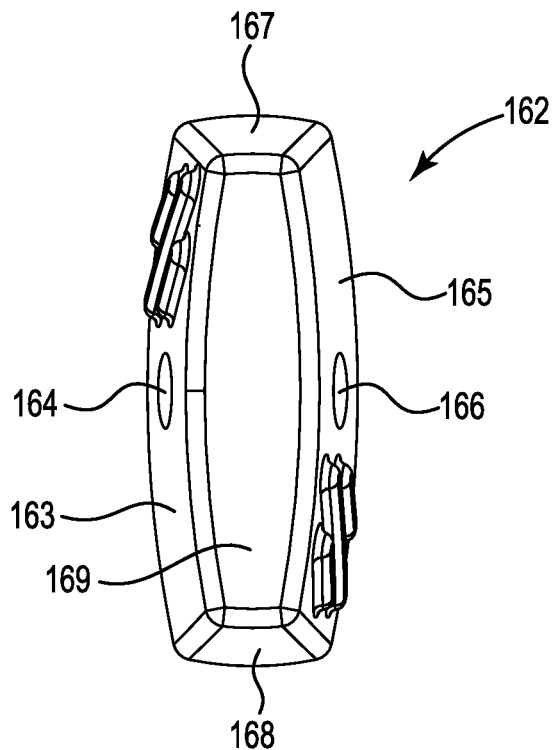
FIG. 17 is a perspective view of an example knob that may be used with an adjuster, such as the ratcheting strap adjuster shown in FIG. 8.

As shown in FIG. 17, the knob 162 includes opposing first and second sides 163 and 165 interconnected by opposing first and second ends 167 and 168, which are connected by a third end 169 to form a cavity 170 therebetween. The first side 163 includes an aperture 164 in alignment with an aperture 166 in the second side 165. Optionally, the cavity 170 may be divided into three sections, the middle section being in communication with the apertures 164 and 166.

To assemble the strap adjuster 100, as one example, the webbing plate 154 is positioned within the cavity 126 of the housing 101 with its second end 158 extending through the aperture 110. The knob 162 is then connected to the second end 158 by inserting a connector 178 such as a spring pin through the aperture 159, inserting the second end 158 into the cavity 170, and positioning the ends of the connector 178 into the apertures 164 and 166. It is recognized that any suitable type of connector could be used such as but not limited to a spring pin, a rivet, and a screw and connected either before or after the second end 158 is inserted into the cavity 170. If the cavity 170 is divided into three sections, the middle section is configured and arranged to receive the second end 158 of the webbing plate 154 so that the aperture 159 is in alignment with the apertures 164 and 166.

The first end 155 of the webbing plate 154 is inserted through the aperture 132 of the spacer plate 130. The first captive member 140 is positioned with the cavity 143 receiving the first receiver 133 and aligned with the aperture 132 proximate the receiving cavity 145*b*. The second captive member 147 is positioned with the cavity 150 receiving the second receiver 134 and aligned with the aperture 132 proximate the receiving cavity 152*b*. The angled portion 114*a* is positioned proximate the bottom and the angled portion 151*a* is positioned proximate the top. A first biasing member 172 is positioned within the receiving cavity 145*a* between the second receiver 134 and the first receiver portion 144. A second biasing member 174 is positioned within the receiving cavity 152*a* between the first receiver 133 and the second receiver portion 151.

The spacer plate 130 is then inserted into the housing 101. The extension 131*a* is positioned within the gap between the divider portion 113 and the extension portion 120, and the first and second apertures 136 and 137 align with the first and second bores 116 and 119. Fasteners 176 and 177 are inserted through the first and second apertures 136 and 137 and into the respective first and second bores 116 and 119 to connect the spacer plate 130 to the housing 101. The first biasing member 172 is positioned within an area of confinement formed by the first receiver 133, the first receiver portion 144, the first plate portion 131, and the second end 112. Therefore, the first biasing member 172 biases or urges the first captive member 140 in a direction toward the first receiver 133. The second biasing member 174 is positioned within an area of confinement formed by the second receiver 134, the second receiver portion 151, the first plate portion 131, and the second end 112. Therefore, the second biasing member 174 biases or urges the second captive member 147 in a direction toward the second receiver 134.

An end of a first strap (not shown) is routed through the slot 105 in the second side 104, and the end is secured onto the strap. An end of a second strap (not shown) is routed through the slot 103 of the first side 102, routed through the slot 157 in the webbing plate 154, and the end is secured onto the strap. It is recognized that other suitable connection methods could be used to connect the strap(s) to the strap adjuster 100.

Figure 18:
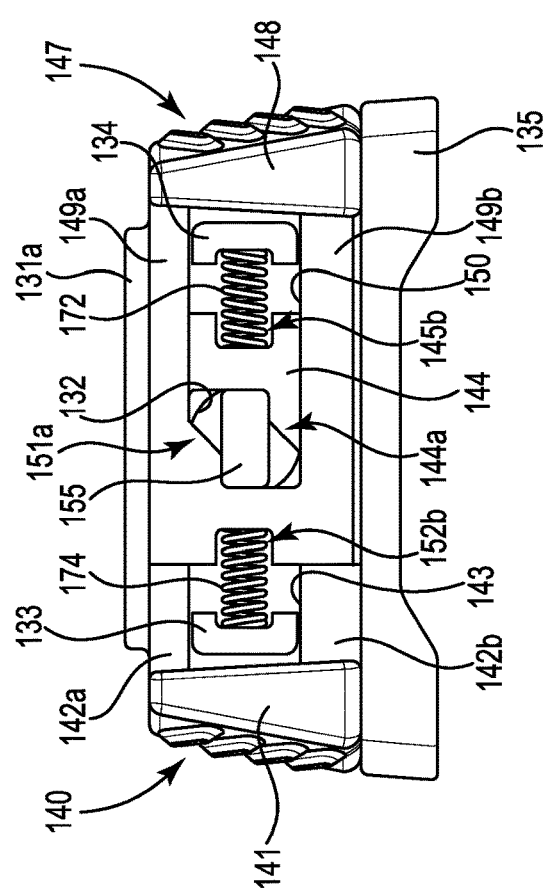
FIG. 18 is a front view of the ratcheting strap adjuster shown in FIG. 8 with a portion of the housing removed to show an example captive member locking mechanism in a locked position.

In use, the captive member locking mechanism 139 is biased in the locked or engaged position. This is shown in FIG. 18. The first and second biasing members 172 and 174 bias the first and second captive members 140 and 147 in locked positions to engage the webbing plate 154. In the locked position, because the angled portion 144a is positioned proximate the bottom and the angled portion 151a is positioned proximate the top, the webbing plate 154 is restricted from rotation in at least one direction. In one example, the webbing plate 154 could be rotated in one direction but not the opposite direction. As shown in FIG. 18, the webbing plate 154 can be rotated in a counterclockwise direction but not a clockwise direction. Therefore, the knob 162 and/or the webbing plate 154 can be rotated in one direction, which causes the second strap to be wound about the intermediate portion 156 of the webbing plate 154. If the second strap is pulled in a direction to unwind second strap or the knob 162 is turned in the opposite direction, the captive members 140 and 147 prevent rotation of the webbing plate 154.

Figure 19:
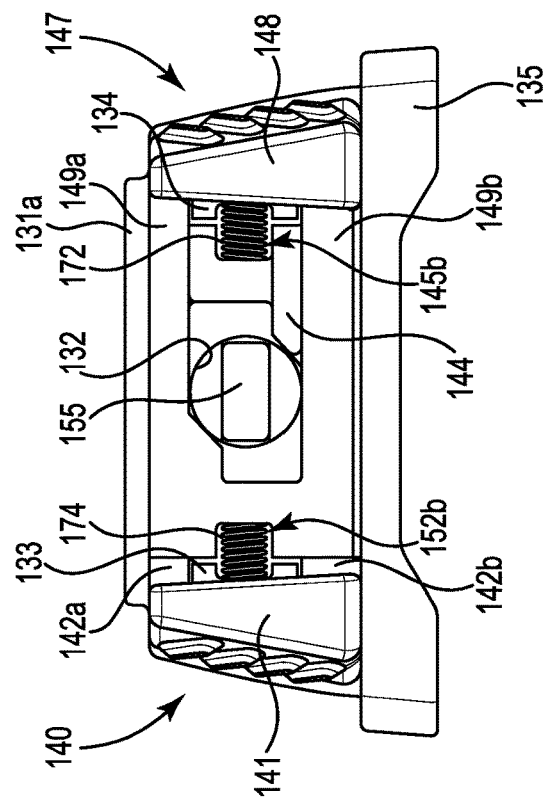
FIG. 19 is a front view of the ratcheting strap adjuster shown in FIG. 18 with the portion of the housing removed to show the example captive member locking mechanism in an unlocked position.

To release the webbing plate 154 and allow the webbing plate 154 to rotate in both directions (to wind and unwind the second strap), the captive members 140 and 147 are moved inward, which moves the receiver portions 144 and 151 away from the webbing plate 154. This is shown in FIG. 19. When the first and second captive members 140 and 147 are moved in generally inward directions, by pressing the first and second buttons 141 and 148 inward, to overcome the force of the first and second biasing members 172 and 174, they are moved into unlocked or disengaged positions, which disengage the webbing plate 154 and allow rotation in either direction. Preferably, both of the captive members 140 and 147 are moved into the unlocked positions to allow rotation of the webbing plate 154 to prevent accidental release of the webbing plate 154.

In another example, referring to FIGS. 20-29, a strap adjuster 200 includes a housing or bracket 201, a captive member locking mechanism 239, a mandrel or webbing plate 254, and a knob 262.

Figure 22:
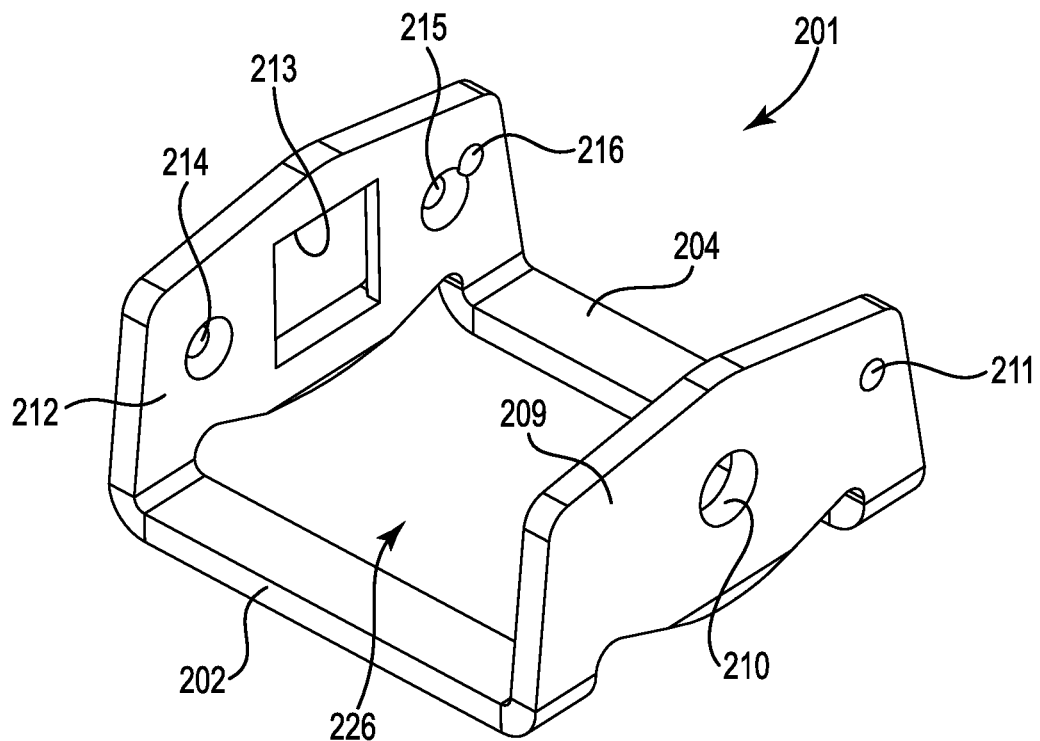
FIG. 22 is a perspective view of an example bracket that may be used with an adjuster, such as the ratcheting strap adjuster shown in FIG. 20.

As shown in FIG. 22, the housing or bracket 201 includes a first end 209 and a second end 212 interconnected proximate their distal bottom ends by a first side 202 and a second side 204. The first end 209 includes an aperture 210 proximate the middle and an aperture 211 proximate the top above the second side 204. The second end 212 includes an opening 213 proximate the middle and generally in alignment with the aperture 210, apertures 214 and 215 on opposing sides of the opening 213, and an aperture 216 proximate the top above the second side 204 and generally in alignment with the aperture 211. The second end 212 may also include flanges 213a and 213b proximate opposing sides of the opening 213 that are preferably flush with an inner surface and recessed with an outer surface of the second end 212. A cavity 226 is generally formed by the first and second sides 202 and 204 and the first and second ends 209 and 212.

Figure 23:
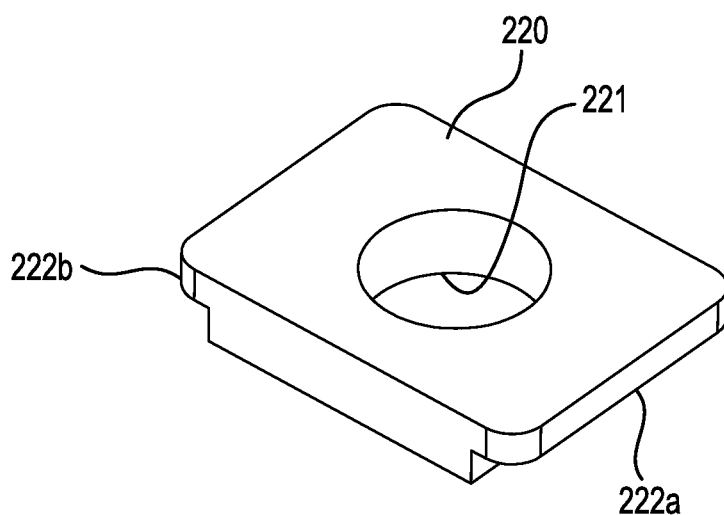
FIG. 23 is a perspective view of an example retainer plate that may be used with an adjuster, such as the ratcheting strap adjuster shown in FIG. 20.

As shown in FIG. 23, a retainer plate 220 includes an aperture 221 proximate the middle and first and second flanges 222a and 222b extending outward from each side that are preferably flush with an outer surface and recessed with an inner surface. The retainer plate 220 mates with the second end 212 such that the first flange 222a is received by the second end 212 proximate the flange 213a and the second flange 222b is received by the second end 212 proximate the flange 213b.

Figure 24:
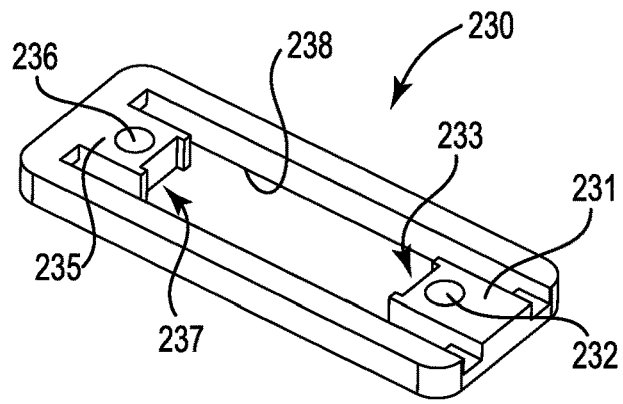
FIG. 24 is a perspective view of an example spacer plate that may be used with an adjuster, such as the ratcheting strap adjuster shown in FIG. 20.

The captive member locking mechanism 239 includes a spacer plate 230 and captive members 240 and 247. As shown in FIG. 24, a spacer plate 230 is generally a rectangular frame with first and second plate portions 231 and 235 extending inward from each side and forming an opening 238 therein. The first plate portion 231 includes an aperture 232 and forms a first receiver 233 at its distal end. The second plate portion 235 includes an aperture 236 and forms a second receiver 237 at its distal end.

Figure 25A:
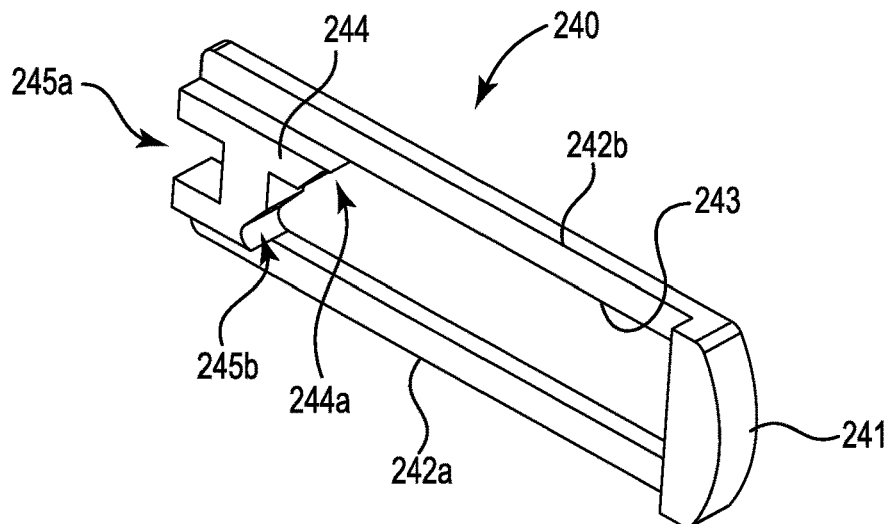
FIG. 25A is a perspective view of an example captive arm that may be used with an adjuster, such as the ratcheting strap adjuster shown in FIG. 20.
Figure 25B:
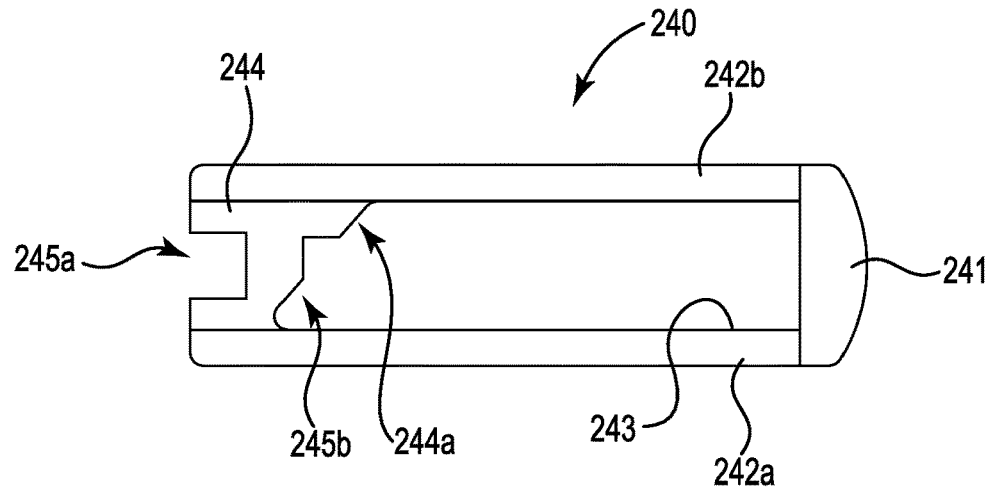
FIG. 25B is a front view of the captive arm shown in FIG. 25A.
Figure 26A:
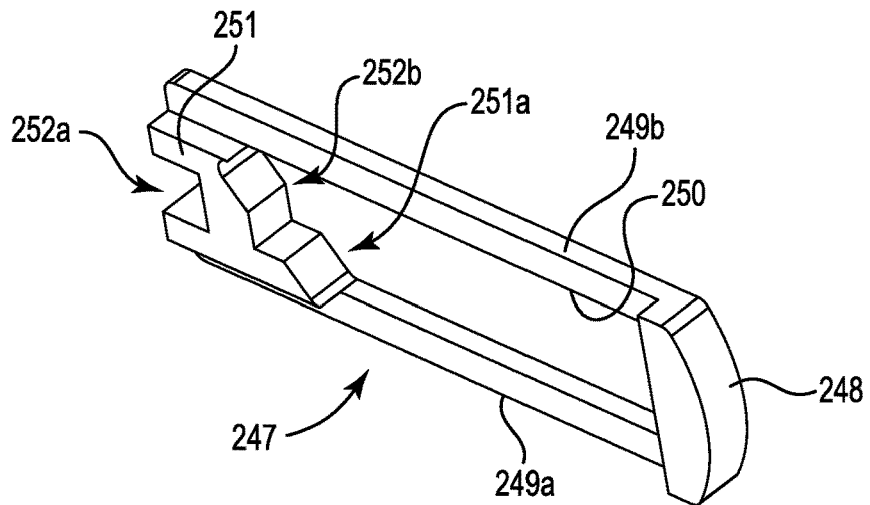
FIG. 26A is a perspective view of another example captive arm that may be used with an adjuster, such as the ratcheting strap adjuster shown in FIG. 20.
Figure 26B:
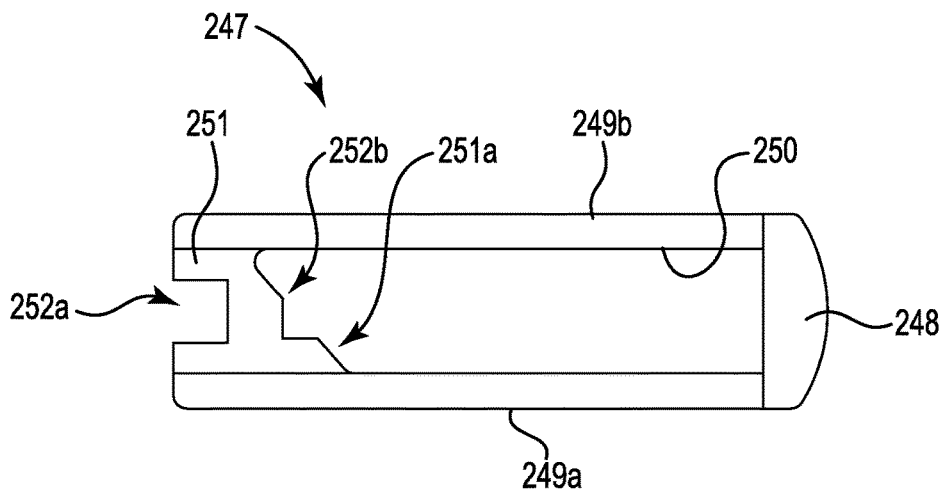
FIG. 26B is a front view of the captive arm shown in FIG. 26A.

The first captive member 240, as shown in FIGS. 25A and 25B, includes a first button 241 from which extensions 242a and 242b extend in parallel and are interconnected by a first receiver portion 244 to form a cavity 243 therebetween. The first receiver portion 244 forms a receiving cavity 245a proximate its distal end and a receiving cavity 245b in communication with the cavity 243. The first receiver portion 244 includes an angled portion 244a that forms part of the receiving cavity 245b. The second captive member 247, shown in FIGS. 26A and 26B, includes a second button 248 from which extensions 249a and 249b extend in parallel and are interconnected by a second receiver portion 251 to form a cavity 250 therebetween. The second receiver portion 251 forms a receiving cavity 252a proximate its distal end and a receiving cavity 252b in communication with the cavity 250. The second receiver portion 251 includes an angled portion 251a that forms part of the receiving cavity 252b.

Figure 20:
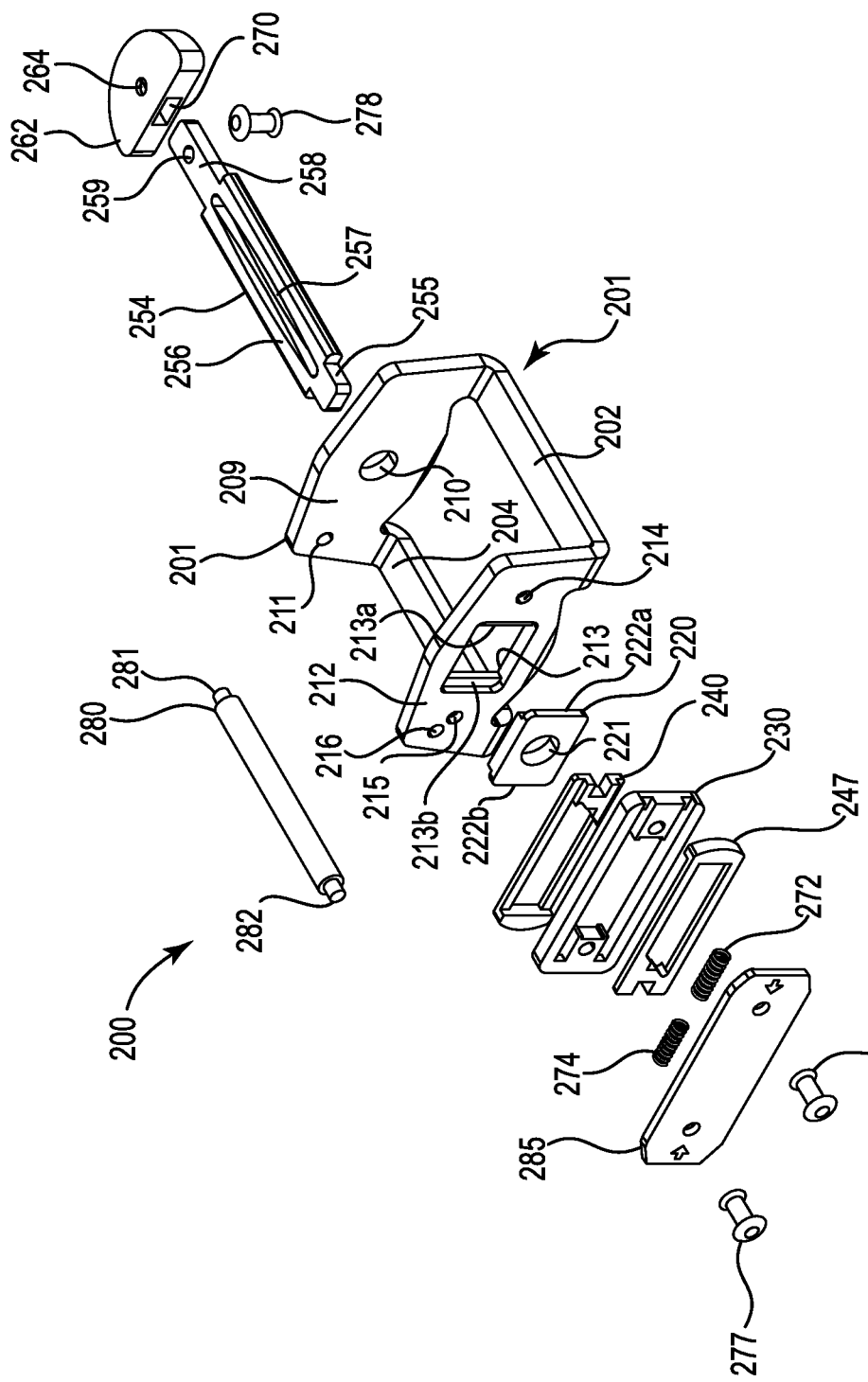
FIG. 20 is an exploded view of another example ratcheting strap adjuster.
Figure 21:
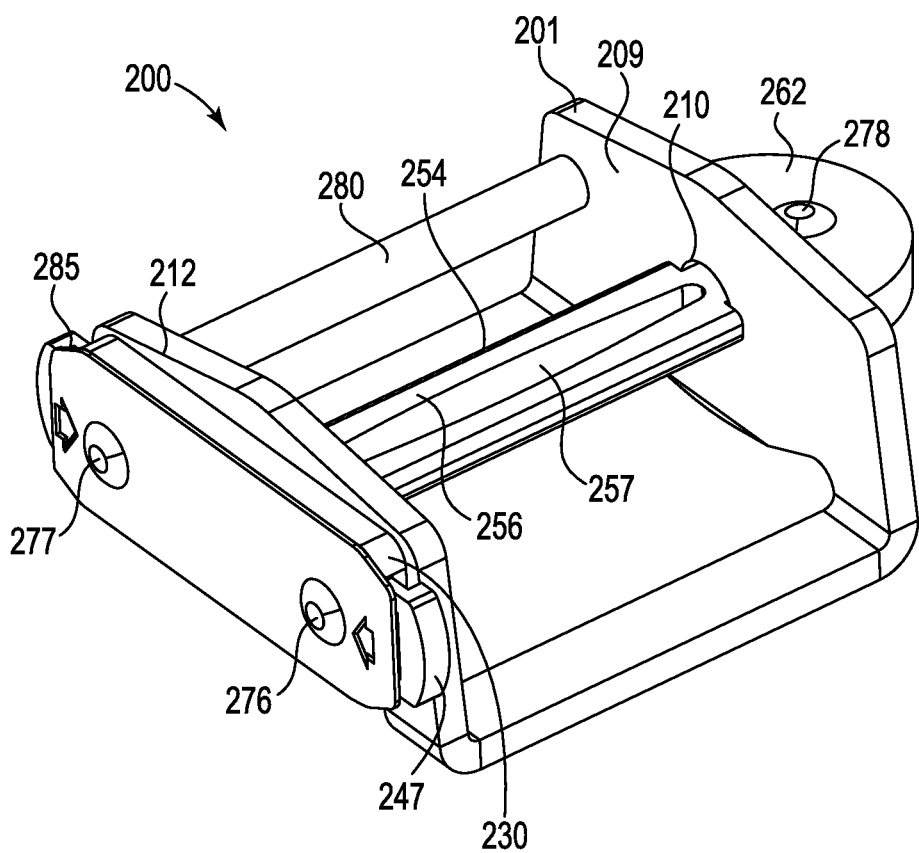
FIG. 21 is a perspective view of the ratcheting strap adjuster shown in FIG. 20.

As shown in FIG. 20, the mandrel or webbing plate 254 is a generally flat, rod-like member with a first end 255, an intermediate portion 256 with a slot 257, and a second end 258 with an aperture 259. A knob 262 includes a cavity 270 configured and arranged to receive the second end 258 of the webbing plate 254 and an aperture 264 in communication with the cavity 270 and in alignment with the aperture 259 when the second end 258 of the webbing plate 254 is received within the cavity 270. A connector 278, for example a rivet, extends through the aperture 264 and the aperture 259 to secure the knob 262 to the webbing plate 254.

Figure 27:
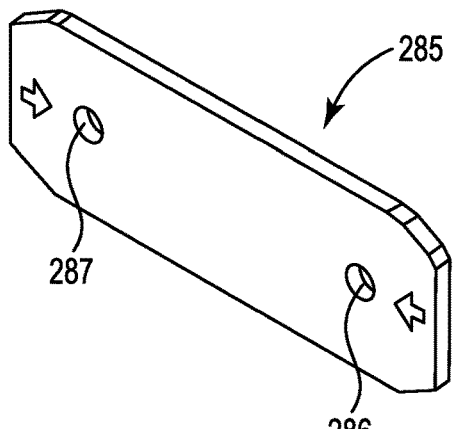
FIG. 27 is a perspective view of an example cover plate that may be used with an adjuster, such as the ratcheting strap adjuster shown in FIG. 20.

As shown in FIG. 27, a cover plate 285 has a shape that generally corresponds with that of the second end 212 and includes apertures 286 and 287 that align with apertures 214 and 215 of the second end 212. As shown in FIG. 20, a roller 280 includes first and second ends 281 and 282 with smaller diameters.

To assemble the strap adjuster 200, as one example, the webbing plate 254 is positioned within the cavity 226 of the housing 201 with its second end 258 extending through the aperture 210. The knob 262 is then connected to the second end 258 by inserting the second end 258 into the cavity 270 and then inserting the connector 278 through the apertures 264 and 259. Although a rivet is shown, it is recognized that any suitable type of connector could be used such as but not limited to a rivet, a spring pin, and a screw.

The first end 255 of the webbing plate 254 is inserted through the opening 213 of the second end 212, and the retainer plate 220 is positioned within the opening 213 so that the first end 255 extends through the aperture 221. The spacer plate 230 is sandwiched between the first and second captive members 240 and 247 such that a first biasing member 272 is positioned between the first receiver 233 and the receiving cavity 245a and a second biasing member 274 is positioned between the second receiver 237 and the receiving cavity 252a. The first end 255 of the webbing plate 254 extends between the first and second receiver portions 244 and 251. The angled portion 251a is positioned proximate the top and the angled portion 244a is positioned proximate the bottom. The first biasing member 272 biases or urges the first captive member 240 in a direction toward the second side 204. The second biasing member 274 biases or urges the second captive member 247 in a direction toward the first side 202.

The cover plate 285 is then positioned over captive member locking mechanism 239; a fastener 276 is inserted through the aperture 286 in the cover plate 285, through the aperture 232 in the spacer plate 230, and through the aperture 214 in the second end 212; and a fastener 277 is inserted through the aperture 287 in the cover plate 285, through the aperture 236 in the spacer plate 230, and through the aperture 215 in the second end.

An end of a first strap (not shown) is routed about the first side 202 and the end is secured onto the strap. An end of a second strap (not shown) is routed between the second side 204 and the roller 280 and through the slot 257 in the webbing plate 254, and the end is secured onto the strap. It is recognized that other suitable connection methods could be used to connect the strap(s) to the strap adjuster 200.

Figure 28:
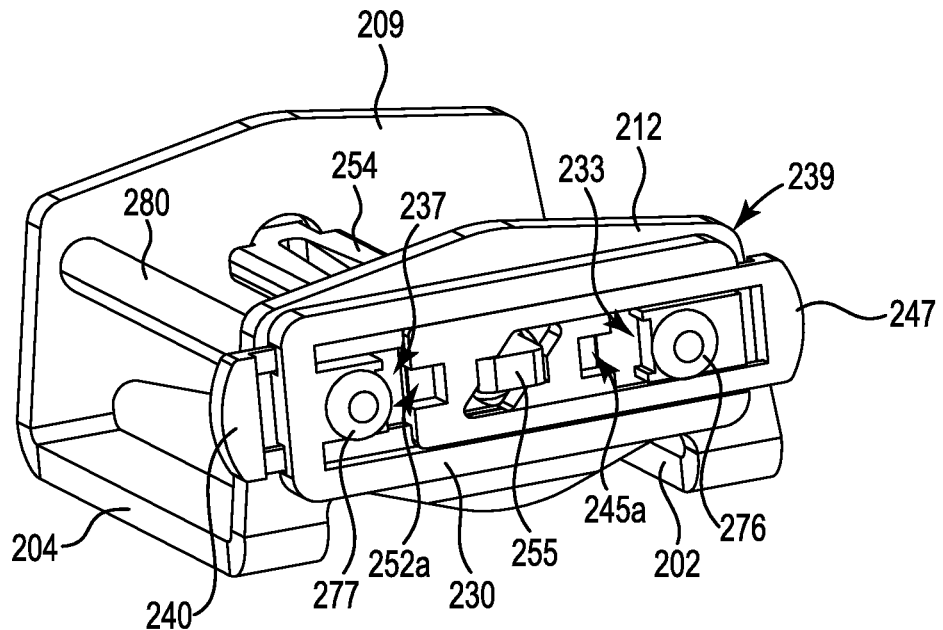
FIG. 28 is a front view of the ratcheting strap adjuster shown in FIG. 20 with a portion of the housing removed to show an example captive member locking mechanism in a locked position.

In use, the captive member locking mechanism 239 is biased in the locked or engaged position. This is shown in FIG. 28. The first and second biasing members 272 and 274 bias the first and second captive members 240 and 247 in locked positions to engage the first end 255 of the webbing plate 254. In the locked position, because the angled portion 251a is positioned proximate the top and the angled portion 244a is positioned proximate the bottom, the webbing plate 254 is restricted from rotation in at least one direction. In one example, the webbing plate 254 could be rotated in one direction but not the opposite direction. As shown in FIG. 28, the webbing plate 254 can be rotated in a counterclockwise direction but not a clockwise direction. Therefore, the knob 262 and/or the webbing plate 254 can be rotated in one direction, which causes the second strap to be wound about the intermediate portion 256 of the webbing plate 254. If the second strap is pulled in a direction to unwind second strap or the knob 262 is turned in the opposite direction, the captive members 240 and 247 prevent rotation of the webbing plate 254.

Figure 29:
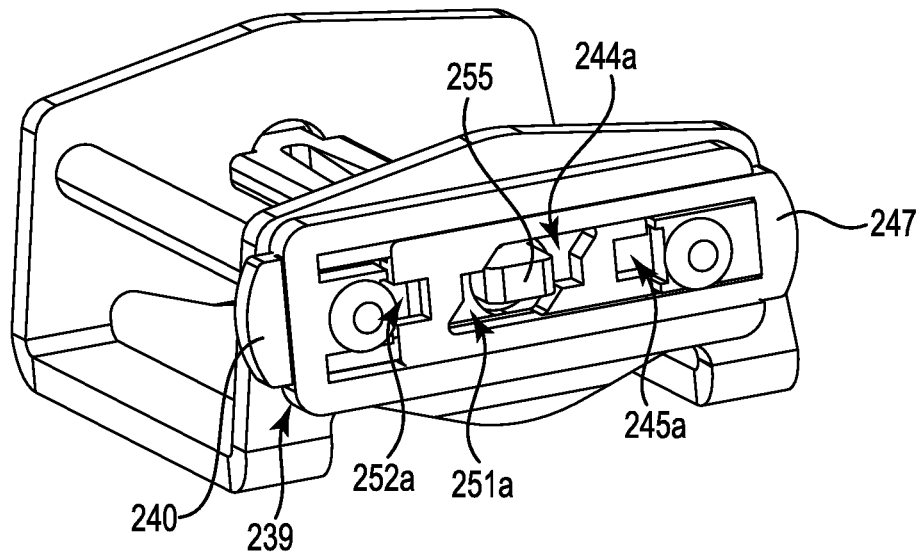
FIG. 29 is a front view of the ratcheting strap adjuster shown in FIG. 20 with a portion of the housing removed to show an example captive member locking mechanism in an unlocked position.

To release the webbing plate 254 and allow the webbing plate 254 to rotate in both directions (to wind and unwind the second strap), the captive members 240 and 247 are moved inward, by pressing the first and second buttons 241 and 248 inward, which moves the first and second receiver portions 244 and 251 in directions away from the webbing plate 254. This is shown in FIG. 29. When the first and second captive members 240 and 147 are moved in generally inward directions to overcome the force of the first and second biasing members 272 and 274, they are moved into unlocked or disengaged positions, which disengage the webbing plate 254 and allow rotation in either direction. Preferably, both of the captive members 240 and 247 are moved into the unlocked positions to allow rotation of the webbing plate 254 to prevent accidental release of the webbing plate 254.

Example strap adjusters are described herein and illustrated in the accompanying drawings. The strap adjusters described herein enable relatively easy adjustment of webbing and/or strap for use, for example, in properly adjusting a fit of a safety harness single handedly and/or without any other tools. This written description uses examples to disclose aspects of the disclosure and also to enable a person skilled in the art to practice the aspects, including making or using the above-described components, assemblies, and/or systems and executing or performing the above-described operations.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, components of the systems described herein and/or operations of the methods described herein may be utilized independently and separately from other components and/or operations.

Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure.

The scope of the disclosure may also include other examples that occur to those skilled in the art. A person skilled in the art would appreciate, for example, that a combination of operations from any number of different examples is within the scope of the disclosure if they have structural elements that do not differ from the literal language of the claims and/or if they include equivalent structural elements with insubstantial differences from the literal language of the claims.

The invention claimed is:

1. A ratcheting strap adjuster, comprising,
a bracket;
a webbing plate rotatably coupled to the bracket; and
one or more captive members moveable between an engaged position and a disengaged position, wherein the one or more captive members restrict rotation of the webbing plate in one direction when the one or more captive members are in the engaged position and allow rotation of the webbing plate in the one direction and in an opposite second direction when the one or more captive members are in the disengaged position, wherein the one or more captive members includes a first captive member and a second captive member forming a cavity in which a portion of the webbing plate is positioned, wherein the first captive member and the second captive member each comprise a receiver portion forming a first receiving cavity and a second receiving cavity, the first receiving cavity configured and arranged to receive a biasing member, the second receiving cavity configured and arranged to receive the portion of the webbing plate.

2. The ratcheting strap adjuster of claim 1, wherein the one or more captive members include an angled portion acting as a stop to restrict rotation of the webbing plate in the one direction when the one or more captive members are in the engaged position.

3. The ratcheting strap adjuster of claim 2, wherein the angled portion allows rotation of the webbing plate in the opposite second direction when the one or more captive members are in the engaged position.

4. The ratcheting strap adjuster of claim 1, wherein the first captive member and the second captive member each comprise:
an angled portion acting as a stop to restrict rotation of the webbing plate in the one direction when the first and second captive members are in the engaged position.

5. The ratcheting strap adjuster of claim 4, wherein the angled portion allows rotation of the webbing plate in the opposite second direction when the first and second captive members are in the engaged position.

6. The ratcheting strap adjuster of claim 1, wherein the bracket includes an aperture through which the portion of the webbing plate extends, a first receiver positioned proximate one side of the aperture, a second receiver positioned proximate an opposing side of the aperture, the first receiver configured and arranged to receive a first biasing member configured and arranged to bias the first captive member, and the second receiver configured and arranged to receive a second biasing member configured and arranged to bias the second captive member.

7. The ratcheting strap adjuster of claim 6, wherein the first and second receivers are part of a spacer plate.

8. The ratcheting strap adjuster of claim 7, wherein the spacer plate is positioned between the first and second captive members.

9. A ratcheting strap adjuster, comprising:
a bracket;
a webbing plate rotatably coupled to the bracket; and
one or more captive members moveable between an engaged position and a disengaged position, wherein the one or more captive members restrict rotation of the webbing plate in one direction when the one or more captive members are in the engaged position and allow rotation of the webbing plate in the one direction and in an opposite second direction when the one or more captive members are in the disengaged position, wherein the one or more captive members includes a first captive member and a second captive member forming a cavity in which a portion of the webbing plate is positioned, wherein the bracket includes an aperture through which the portion of the webbing plate extends, a first receiver positioned proximate one side of the aperture, a second receiver positioned proximate an opposing side of the aperture, the first receiver configured and arranged to receive a first biasing member configured and arranged to bias the first captive member, and the second receiver configured and arranged to receive a second biasing member configured and arranged to bias the second captive member.

10. The ratcheting strap adjuster of claim 9, wherein the first and second receivers are part of a spacer plate.

11. The ratcheting strap adjuster of claim 10, wherein the spacer plate is positioned between the first and second captive members.

12. The ratcheting strap adjuster of claim 9, wherein the one or more captive members include an angled portion acting as a stop to restrict rotation of the webbing plate in the one direction when the one or more captive members are in the engaged position.

13. The ratcheting strap adjuster of claim 12, wherein the angled portion allows rotation of the webbing plate in the opposite second direction when the one or more captive members are in the engaged position.

14. The ratcheting strap adjuster of claim 8, wherein the first captive member and the second captive member each comprise an angled portion acting as a stop to restrict rotation of the webbing plate in the one direction when the first and second captive members are in the engaged position.

15. The ratcheting strap adjuster of claim 14, wherein the angled portion allows rotation of the webbing plate in the opposite second direction when the first and second captive members are in the engaged position.

16. The ratcheting strap adjuster of claim 9, wherein the first captive member and the second captive member each comprise a receiver portion forming a first receiving cavity and a second receiving cavity, the first receiving cavity configured and arranged to receive a biasing member, the second receiving cavity configured and arranged to receive the portion of the webbing plate.

17. A ratcheting strap adjuster, comprising:
a bracket;
a webbing plate rotatably coupled to the bracket;
a first captive member and a second captive member moveable between an engaged position and a disengaged position, wherein each of the first and second captive members includes an angled portion configured and arranged to restrict rotation of the webbing plate in one direction when the first and second captive members are in the engaged position and allow rotation of the webbing plate in the one direction and in an opposite second direction when the first and second captive members are in the disengaged position,
wherein the first captive member and the second captive member each comprise a receiver portion forming a first receiving cavity and a second receiving cavity, the first receiving cavity configured and arranged to receive a biasing member, the second receiving cavity configured and arranged to receive the portion of the webbing plate; and
wherein the bracket includes an aperture through which the portion of the webbing plate extends, a first receiver position proximate one side the aperture, a second receiver positioned proximate an opposing side of the aperture, the first receiver configured and arranged to receive a first biasing member configure and arranged to bias the first captive member, and the second receiver configured and arranged to receive a second biasing member configured and arranged to bias the second captive member.

18. The ratcheting strap adjuster of claim 17, wherein each of the angled portions allows rotation of the webbing plate in the opposite second direction when the first and second captive members are in the engaged position.

19. The ratcheting strap adjuster of claim 17, wherein the first and second receivers are part of a spacer plate.

* * * * *

UNITED STATES PATENT AND TRADEMARK OFFICE
CERTIFICATE OF CORRECTION

| | |
|---|---|
| PATENT NO. | : 10,718,406 B2 |
| APPLICATION NO. | : 16/192243 |
| DATED | : July 21, 2020 |
| INVENTOR(S) | : William Leo Farrell |

It is certified that error appears in the above-identified patent and that said Letters Patent is hereby corrected as shown below:

In the Claims

Column 14, Line 13, delete "adjuster of claim 8" and insert in place thereof --adjuster of claim 9--.

Signed and Sealed this
Twenty-second Day of August, 2023

Katherine Kelly Vidal
*Director of the United States Patent and Trademark Office*